United States Patent
Mignogna et al.

(10) Patent No.: US 9,670,298 B2
(45) Date of Patent: Jun. 6, 2017

(54) MAGNESIUM DICHLORIDE-ETHANOL ADDUCTS AND CATALYST COMPONENT OBTAINED THEREFROM

(71) Applicant: Basell Poliolefine Italia S.r.l., Milan (IT)

(72) Inventors: Alessandro Mignogna, Ferrara (IT); Davide Balboni, Ferarra (IT); Antonio Cristofori, Ferrara (IT); Giampiero Morini, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 293 days.

(21) Appl. No.: 14/432,080

(22) PCT Filed: Sep. 23, 2013

(86) PCT No.: PCT/EP2013/069653
§ 371 (c)(1),
(2) Date: Mar. 27, 2015

(87) PCT Pub. No.: WO2014/048861
PCT Pub. Date: Apr. 3, 2014

(65) Prior Publication Data
US 2015/0266981 A1    Sep. 24, 2015

Related U.S. Application Data

(60) Provisional application No. 61/708,539, filed on Oct. 1, 2012.

(30) Foreign Application Priority Data

Sep. 28, 2012 (EP) .................................... 12186539

(51) Int. Cl.

| | | |
|---|---|---|
| *B01J 31/00* | (2006.01) | |
| *B01J 37/00* | (2006.01) | |
| *B01J 27/24* | (2006.01) | |
| *C08F 4/02* | (2006.01) | |
| *C08F 4/60* | (2006.01) | |
| *C08F 4/06* | (2006.01) | |
| *C08F 2/00* | (2006.01) | |
| *C08F 4/00* | (2006.01) | |
| *C08F 4/44* | (2006.01) | |
| *C08F 110/06* | (2006.01) | |
| *C08F 10/06* | (2006.01) | |

(52) U.S. Cl.
CPC ............ *C08F 110/06* (2013.01); *C08F 10/06* (2013.01)

(58) Field of Classification Search
CPC ... B01J 31/00; B01J 37/00; C08F 2/00; C08F 4/00; C08F 4/02; C08F 4/06; C08F 4/44; C08F 4/60
USPC ..... 502/123, 125, 127, 167, 200; 526/124.9, 526/141, 147, 215, 236, 217
See application file for complete search history.

(56) References Cited

U.S. PATENT DOCUMENTS 3,318,858 A    5/1967    Nakaguchi et al.

FOREIGN PATENT DOCUMENTS

| CN | 1726080 A | 1/2006 | |
|---|---|---|---|
| WO | WO 2011106494 A1 * | 9/2011 | ............ C08F 10/06 |

* cited by examiner

Primary Examiner — Fred M Teskin
Assistant Examiner — Elizabeth Eng

(57) ABSTRACT

Catalyst component for the polymerization of olefins comprising Mg, Ti and an electron donor of formula (I)

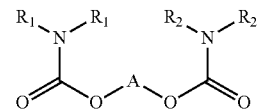

Where $R_1$ and $R_2$, independently, are selected from hydrogen and $C_1$-$C_{15}$ hydrocarbon groups, optionally contain an heteroatom selected from halogen, P, S, N, O and Si, which can be fused together to form one or more closed cycles and A is a bivalent bridging group.

13 Claims, No Drawings

MAGNESIUM DICHLORIDE-ETHANOL ADDUCTS AND CATALYST COMPONENT OBTAINED THEREFROM

This application is the U.S. National Phase of PCT International Application PCT/EP2013/069653, filed Sep. 23, 2013, claiming benefit of priority to European Patent Application No.12186539.8, filed Sep. 28, 2012, and benefit of priority under 35 U.S.C. §119(e) of U.S. Provisional Application No. 61/708,539 filed Oct. 1, 2012, the contents of which are incorporated herein by reference in their entirety.

FIELD OF INVENTION

The present invention relates to catalyst components for the polymerization of olefins, in particular propylene, comprising a Mg dihalide based support on which are supported Ti atoms and an electron donor selected from a specific class of dicarbamates. The present invention further relates to the catalysts obtained from said components and to their use in processes for the polymerization of olefins in particular propylene.

BACKGROUND OF INVENTION

Catalyst components for the stereospecific polymerization of olefins are widely known in the art. Concerning the polymerization of propylene, the most spread out catalyst family belongs to the Ziegler-Natta category and in general terms it comprises a solid catalyst component, constituted by a magnesium dihalide on which are supported a titanium compound and an internal electron donor compound, used in combination with an Al-alkyl compound. Conventionally however, when a higher cristallinity of the polymer is required, also an external donor (for example an alkoxysilane) is needed in order to obtain higher isotacticity. One of the preferred classes of internal donors is constituted by the esters of phthalic acid, diisobutylphthalate being the most used. The phthalates are used as internal donors in combination with alkylalkoxysilanes as external donor. This catalyst system gives good performances in terms of activity, isotacticity and xylene insolubility.

One of the problems associated with the use of this catalyst system is that the phthalates have recently raised concerns due to the medical issues associated with their use and some compounds within this class have been classified as source of heavy health problems.

Consequently, research activities have been devoted to discover alternative classes of internal donors for use in the preparation of catalyst components for propylene polymerization.

Some of the tested catalysts contain donors structures having contemporaneously amido groups and ester groups. WO2006110234 describes amino acid derivatives including one carbamate group and one free ester function. The catalysts generated by these structures have very low activity and sterospecificity in bulk propylene polymerization (table 2). In CN1104589 are described amino ester derivatives of formula R1-C(O)—O-A-NR$_2$R$_3$ in which R$_1$ is a hydrocarbon group with 6-20 carbon atoms, particularly aryl or alkaryl; R$_2$-R$_3$ are hydrogen, C$_1$-C$_6$ alkyl, or R$_1$; and A is a C$_1$-C$_{12}$ bivalent compound optionally substituted. Also in this case however, the activities/stereospecificity balance is very far from being acceptable for industrial exploitation.

Surprisingly, the applicant has found that a particular class of donors based on dicarbamates groups generates catalysts showing an excellent balance of activity and stereospecificity.

SUMMARY OF THE INVENTION

Accordingly, it is an object of the present invention a catalyst component for the polymerization of olefins comprising Mg, Ti and an electron donor of formula (I)

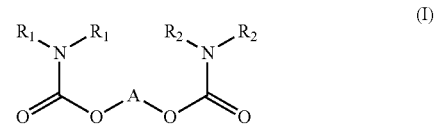

Where R$_1$ and R$_2$, independently, are selected from hydrogen and C$_1$-C$_{15}$ hydrocarbon groups, optionally contain a heteroatom selected from halogen, P, S, N, O and Si, which can be fused together to form one or more cycles and A is a bivalent bridging group.

DETAILED DESCRIPTION OF THE INVENTION

Preferably, A is a bivalent bridging group with chain length between the two bridging bonds being 1-10 atoms. In case of cyclic structures acting as bridging groups the term "chain length" is referred to the shortest sequence of atoms bridging the oxygen atoms of formula (I). In a preferred general embodiment, the bridging group has formula —(ZR$^3_m$)$_n$— in which, independently, Z is selected from C, Si, Ge, O, N, S or P, the R$^3$ groups, equal to or different from each other, are hydrogen or a C$_1$-C$_{20}$ hydrocarbon radicals, optionally containing a heteroatom selected from halogen, P, S, N, O and Si, which can be fused together to form one or more cycles, m is a number satisfying the valences of Z and n is an integer ranging from 1 to 10. Preferably, in the bridging group has formula —(ZR$^3_m$)$_n$-the atoms O, S, and N are not directly linked to the oxygen of formula (I), i.e. they are not the terminal atoms of the bridging group. Preferably, Z is selected from C and Si. In a more preferred embodiment, Z is carbon.

In a particular embodiment, the said bivalent bridging group is selected from the group consisting of aliphatic, alicyclic and aromatic bivalent radicals, optionally substituted with C$_1$-C$_{15}$ hydrocarbon groups and/or with heteroatoms selected from halogen, P, S, N, O and Si, and having a bridging chain length ranging from 1 to 6 atoms and especially from 1 to 4 atoms.

In a particularly preferred embodiment, the bridging group is an aliphatic or alicyclic bridging group having a bridging chain length of 2-3 carbon atoms. Among this class, particularly preferred bridging groups are those of formula —(CR$^4_p$)$_s$— in which R$^4$ is, independently, hydrogen or a C$_1$-C$_{20}$ hydrocarbon radicals, optionally substituted with heteroatoms selected from halogen, P, S, N, O and Si, which can be fused together to form one or more cycles, p is a number satisfying the available valence of carbon and s is a number from 1 to 6 preferably from 1 to 4. Examples of bridging groups are methyliden, 4-ethane-1,2-diyl, butane-2,3-diyl, pentane-2,4-diyl, 2,2-diisobutylpropane-1,3-diyl, cyclohexane-1,2-diyl, cyclopentane-1,2-diyl.

Another class of preferred bridging group is the one based on cyclic aromatic groups which through the carbon ring atoms can link the two oxygen of formula (I). Among them, particularly preferred are the phenyl groups, optionally substituted with halogens or $C_1$-$C_{20}$ alkyl radicals, bridging the oxygen atoms in position 1,2 or 1,3 or 1,4 and the naphthalene groups, optionally substituted bridging the oxygen groups in position 1,2 or, 2,3 or, 1,8. Among them, particularly preferred are the structure of formula (II) below

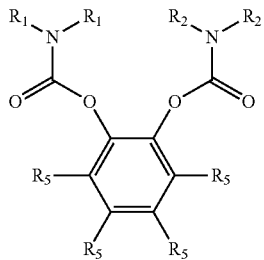

In which $R_1$ and $R_2$ have the same meaning previously specified, and $R_5$, independently, is selected from hydrogen, halogens or $C_1$-$C_{15}$ hydrocarbon groups optionally substituted with heteroatoms selected from halogen, P, S, N, O and Si, with the proviso that at least one of $R_5$ is different from hydrogen.

Preferred structures of formula (II) are those in which the $R_5$ groups in position 3,5 and/or 6 are $C_1$-$C_5$ alkyl groups. Particularly preferred is the substitution in position 3 with a primary alkyl group especially methyl, and in position 5 with a tertiary alkyl group especially tert-butyl.

Specific examples are 1,2-phenylene, 3-methyl-1,2-phenylene, 4-chloro-1,2-phenylene, 4-(tert-butyl)-1,2-phenylene, 3,6-dimethyl-1,2-phenylene, 3,5-dimethyl-1,2-phenylene, 5-(tert-butyl)-3-methyl-1,2-phenylene, 3,5-diisopropyl-1,2-phenylene, naphthalene-1,8-diyl, naphthalene-1,2-diyl, naphthalene-2,3-diyl groups.

Preferably, in the formulas (I) and (II) the $R_1$-$R_2$ groups are independently selected from hydrogen, $C_1$-$C_{15}$ alkyl groups, $C_6$-$C_{14}$ aryl groups, $C_3$-$C_{15}$ cycloalkyl groups, and $C_7$-$C_{15}$ arylalkyl or alkylaryl groups. More preferably, $R_1$ and $R_2$ are selected from hydrogen or $C_1$-$C_{10}$ alkyl groups and even more preferably from hydrogen or $C_1$-$C_5$ alkyl groups in particular ethyl. In one preferred embodiment hydrogen and ethyl are preferred. In one particular preferred embodiment both $R_1$ and $R_2$ are ethyl.

Preferably, the final amount of electron donor compound in the solid catalyst component ranges from 1 to 25% by weight preferably in the range from 3 to 20% by weight.

Non limiting examples of structures of formulas (I) and (II) are the following: 1,2-diphenylethane-1,2-diyl dicarbamate, 1-phenylbutane-1,2-diyl dicarbamate, 1-phenylethane-1,2-diyl dicarbamate, 1-phenylpropane-1,2-diyl dicarbamate, 2,5-dimethylhexane-3,4-diyl dicarbamate, 2-methylhexane-3,4-diyl dicarbamate, 3-methyl-1-phenylbutane-1,2-diyl dicarbamate, 3-methylbutane-1,2-diyl dicarbamate, 4-methylpentane-2,3-diyl dicarbamate, butane-1,2-diyl dicarbamate, butane-2,3-diyl dicarbamate, ethane-1,2-diyl dicarbamate, hexane-3,4-diyl dicarbamate, pentane-2,3-diyl dicarbamate, propane-1,2-diyl dicarbamate, 2,5-dimethylhexane-3,4-diyl bis(dimethylcarbamate), 2-methylhexane-3,4-diyl bis(dimethylcarbamate), 3-methylbutane-1,2-diyl bis(dimethylcarbamate), 4-methylpentane-2,3-diyl bis(dimethylcarbamate), butane-1,2-diyl bis(dimethylcarbamate), butane-2,3-diyl bis(dimethylcarbamate), ethane-1,2-diyl bis(dimethylcarbamate), hexane-3,4-diyl bis(dimethylcarbamate), pentane-2,3-diyl bis(dimethylcarbamate), propane-1,2-diyl bis(dimethylcarbamate), 2,5-dimethylhexane-3,4-diyl bis(diethylcarbamate), 2-methylhexane-3,4-diyl bis(diethylcarbamate), 3-methylbutane-1,2-diyl bis(diethylcarbamate), 4-methylpentane-2,3-diyl bis(diethylcarbamate), butane-1,2-diyl bis(diethylcarbamate), butane-2,3-diyl bis(diethylcarbamate), ethane-1,2-diyl bis(diethylcarbamate), hexane-3,4-diyl bis(diethylcarbamate), pentane-2,3-diyl bis(diethylcarbamate), propane-1,2-diyl bis(diethylcarbamate), 2,5-dimethylhexane-3,4-diyl bis(diisopropylcarbamate), 2-methylhexane-3,4-diyl bis(diisopropylcarbamate), 3-methylbutane-1,2-diyl bis(diisopropylcarbamate), 4-methylpentane-2,3-diyl bis(diisopropylcarbamate), butane-1,2-diyl bis(diisopropylcarbamate), butane-2,3-diyl bis(diisopropylcarbamate), ethane-1,2-diyl bis(diisopropylcarbamate), hexane-3,4-diyl bis(diisopropylcarbamate), pentane-2,3-diyl bis(diisopropylcarbamate), propane-1,2-diyl bis(diisopropylcarbamate), 2,5-dimethylhexane-3,4-diyl bis(pyrrolidine-1-carboxylate), 2-methylhexane-3,4-diyl bis(pyrrolidine-1-carboxylate), 3-methylbutane-1,2-diyl bis(pyrrolidine-1-carboxylate), 4-methylpentane-2,3-diyl bis(pyrrolidine-1-carboxylate), butane-1,2-diyl bis(pyrrolidine-1-carboxylate), butane-2,3-diyl bis(pyrrolidine-1-carboxylate), ethane-1,2-diyl bis(pyrrolidine-1-carboxylate), hexane-3,4-diyl bis(pyrrolidine-1-carboxylate), pentane-2,3-diyl bis(pyrrolidine-1-carboxylate), propane-1,2-diyl bis(pyrrolidine-1-carboxylate), 2,5-dimethylhexane-3,4-diyl bis(diphenylcarbamate), 2-methylhexane-3,4-diyl bis(diphenylcarbamate), 3-methylbutane-1,2-diyl bis(diphenylcarbamate), 4-methylpentane-2,3-diyl bis(diphenylcarbamate), butane-1,2-diyl bis(diphenylcarbamate), butane-2,3-diyl bis(diphenylcarbamate), ethane-1,2-diyl bis(diphenylcarbamate), hexane-3,4-diyl bis(diphenylcarbamate), pentane-2,3-diyl bis(diphenylcarbamate), propane-1,2-diyl bis(diphenylcarbamate), cyclohexane-1,2-diyl bis(pyrrolidine-1-carboxylate), cyclohexane-1,2-diyl bis(diethylcarbamate), cyclohexane-1,2-diyl bis(diisopropylcarbamate), cyclohexane-1,2-diyl bis(dimethylcarbamate), cyclohexane-1,2-diyl bis(diphenylcarbamate), cyclohexane-1,2-diyl dicarbamate, 2,3-dimethylbutane-2,3-diyl bis(pyrrolidine-1-carboxylate), 2,3-dimethylbutane-2,3-diyl bis(diethylcarbamate), 2,3-dimethylbutane-2,3-diyl bis(diisopropylcarbamate), 2,3-dimethylbutane-2,3-diyl bis(dimethylcarbamate), 2,3-dimethylbutane-2,3-diyl bis(diphenylcarbamate), 2,3-dimethylbutane-2,3-diyl dicarbamate, pentane-2,4-diyl bis(pyrrolidine-1-carboxylate), pentane-2,4-diyl bis(diethylcarbamate), pentane-2,4-diyl bis(diisopropylcarbamate), pentane-2,4-diyl bis(dimethylcarbamate), pentane-2,4-diyl bis(diphenylcarbamate), pentane-2,4-diyl dicarbamate, propane-1,3-diyl bis(pyrrolidine-1-carboxylate), pentane-2,4-diyl bis(dimethylcarbamate), pentane-2,4-diyl dicarbamate, propane-1,3-diyl bis(diethylcarbamate), propane-1,3-diyl bis(diisopropylcarbamate), propane-1,3-diyl bis(diphenylcarbamate), 2,2-dimethylpropane-1,3-diyl bis(pyrrolidine-1-carboxylate), 2,2-dimethylpropane-1,3-diyl bis(diethylcarbamate), 2,2-dimethylpropane-1,3-diyl bis(diisopropylcarbamate), 2,2-dimethylpropane-1,3-diyl bis(dimethylcarbamate), 2,2-dimethylpropane-1,3-diyl bis(diphenylcarbamate), 2,2-dimethylpropane-1,3-diyl dicarbamate, 2,2-diisopropylpropane-1,3-diyl bis(pyrrolidine-1-carboxylate), 2,2-diisopropylpropane-1,3-diyl bis(diethylcarbamate), 2,2-diisopropylpropane-1,3-diyl bis(diisopropylcarbamate), 2,2-diisopropylpropane-1,3-diyl bis(dimethylcarbamate), 2,2-diisopropylpropane-1,3-diyl bis(diphenylcarbamate), 2,2-diisopropylpropane-1,3-diyl dicarbamate, 2,2-diisobutylpropane-1,3-diyl bis(pyrrolidine-1-carboxylate), 2,2-diisobutylpropane-1,3-diyl bis(diethylcarbamate), 2,2-diisobutylpropane-1,3-diyl bis(diisopropylcarbamate), 2,2-diisobutylpropane-1,3-diyl bis(dimethylcarbamate), 2,2-diisobutylpropane-1,3-diyl bis(diphenylcarbamate), 2,2-diisobutylpropane-1,3-diyl dicarbamate, (9H-fluorene-9,9-diyl)bis(methylene)bis(pyrrolidine-1-carboxylate), (9H-fluorene-9,9-diyl)bis(methylene)bis(diethylcarbamate), (9H-fluorene-9,9-diyl)bis(methylene) bis(diisopropylcarbamate), (9H-fluorene-9,9-diyl)bis(methylene)bis(diphenylcarbamate), pentane-2,4-diyl bis(dimethylcarbamate), pentane-2,4-diyl dicarbamate, (diethylsilanediyl)bis(methylene)bis(diethylcarbamate), (dimethylsilanediyl)bis(methylene) bis(diethylcarbamate), (ethyl(methyl)silanediyl)bis(methylene)bis(diethylcarbamate), (isobutyl(methyl)silanediyl)bis(methylene)bis(diethylcarbamate), 2-(hydroxymethyl)phenol bis(pyrrolidine-1-carboxylate), 2-(hydroxymethyl)phenol bis(diethylcarbamate), 2-(hydroxymethyl)phenol bis(diisopropylcarbamate), 2-(hydroxymethyl)phenol bis(dimethylcarbamate), 2-(hydroxymethyl)phenol bis(diphenylcarbamate), 2-(hydroxymethyl)phenol dicarbamate, 2,3-diisopropylbutane-1,4-diyl bis(pyrrolidine-1-carboxylate), 2,3-diisopropylbutane-1,4-diyl bis(diethylcarbamate), 2,3-diisopropylbutane-1,4-diyl bis(diisopropylcarbamate), 2,3-diisopropylbutane-1,4-diyl bis(dimethylcarbamate), 2,3-diisopropylbutane-1,4-diyl bis(diphenylcarbamate), 2,3-diisopropylbutane-1,4-diyl dicarbamate, [1,1'-biphenyl]-2,2'-diyl bis(pyrrolidine-1-carboxylate), [1,1'-biphenyl]-2,2'- diyl bis(diethylcarbamate), [1,1'-biphenyl]-2,2'-diyl bis(diisopropylcarbamate), [1,1'-biphenyl]-2,2'-diyl bis(dimethylcarbamate), [1,1'-biphenyl]-2,2'-diyl bis(diphenylcarbamate), [1,1'-biphenyl]-2,2'-diyl dicarbamate, 1,2-phenylenebis(methylene)bis(pyrrolidine-1-carboxylate), 1,2-phenylenebis(methylene)bis(diethylcarbamate), 1,2-phenylenebis(methylene) bis(diisopropylcarbamate), 1,2-phenylenebis(methylene)bis(dimethylcarbamate), 1,2-phenylenebis(methylene)bis(diphenylcarbamate), 1,2-phenylenebis(methylene) dicarbamate, 1,2-phenylenebis(pyrrolidine-1-carboxylate), 1,2-phenylenebis(diethylcarbamate), 1,2-phenylene bis(diisopropylcarbamate),1,2-phenylene bis(dimethylcarbamate), 1,2-phenylene bis(diphenylcarbamate), 1,2-phenylene dicarbamate, 3-methyl-1,2-phenylenebis(pyrrolidine-1-carboxylate), 3-methyl-1,2-phenylene bis(diethylcarbamate), 3-methyl-1,2-phenylene bis(diisopropylcarbamate), 3-methyl-1,2-phenylene bis(dimethylcarbamate), 3-methyl-1,2-phenylene bis(diphenylcarbamate), 3-methyl-1,2-phenylene dicarbamate, 3,5-dimethyl-1,2-phenylene bis(pyrrolidine-1-carboxylate), 3,5-dimethyl-1,2-phenylene bis(diethylcarbamate), 3,5-dimethyl-1,2-phenylene bis(diisopropylcarbamate), 3,5-dimethyl-1,2-phenylene bis(dimethylcarbamate), 3,5-dimethyl-1,2-phenylene bis(diphenylcarbamate), 3,5-dimethyl-1,2-phenylene dicarbamate, 3,6-dimethyl-1,2-phenylene bis(pyrrolidine-1-carboxylate), 3,6-dimethyl-1,2-phenylene bis(diethylcarbamate), 3,6-dimethyl-1,2-phenylene bis(diisopropylcarbamate), 3,6-dimethyl-1,2-phenylene bis(dimethylcarbamate), 3,6-dimethyl-1,2-phenylene bis(diphenylcarbamate), 3,6-dimethyl-1,2-phenylene dicarbamate, 5-(tert-butyl)-3-methyl-1,2-phenylene bis(pyrrolidine-1-carboxylate), 5-(tert-butyl)-3-methyl-1,2-phenylene bis(diethylcarbamate), 5-(tert-butyl)-3-methyl-1,2-phenylene bis(diisopropylcarbamate), 5-(tert-butyl)-3-methyl-1,2-phenylene bis(dimethylcarbamate), 5-(tert-butyl)-3-methyl-1,2-phenylene bis(diphenylcarbamate), 5-(tert-butyl)-3-methyl-1,2-phenylene dicarbamate, 3,5-di-tert-butyl-1,2-phenylene bis(pyrrolidine-1-carboxylate), 3,5-di-tert-butyl-1,2-phenylene bis(diethylcarbamate), 3,5-di-tert-butyl-1,2-phenylene bis(diisopropylcarbamate), 3,5-di-tert-butyl-1,2-phenylene bis(dimethylcarbamate), 3,5-di-tert-butyl-1,2-phenylene bis(diphenylcarbamate), 3,5-di-tert-butyl-1,2-phenylene dicarbamate, 4-(tert-butyl)-1,2-phenylene bis(pyrrolidine-1-carboxylate), 4-(tert-butyl)-1,2 -phenylene bis(diethylcarbamate), 4-(tert-butyl)-1,2-phenylene bis(diisopropylcarbamate), 4-(tert-butyl)-1,2-phenylene bis(dimethylcarbamate), 4-(tert-butyl)-1,2-phenylene bis(diphenylcarbamate), 4-(tert-butyl)-1,2-phenylene dicarbamate, 3-isopropyl-6-methyl-1,2-phenylene bis(pyrrolidine-1-carboxylate), 3-isopropyl-6-methyl-1,2-phenylene bis(diethylcarbamate), 3-isopropyl-6-methyl-1,2-phenylene bis(diisopropylcarbamate), 3-isopropyl-6-methyl-1,2-phenylene bis(dimethylcarbamate), 3-isopropyl-6-methyl-1,2-phenylene bis(diphenylcarbamate), 3-isopropyl-6-methyl-1,2-phenylene dicarbamate, 4-chloro-1,2 -phenylene bis(pyrrolidine-1-carboxylate), 4-chloro-1,2-phenylene bis(diethylcarbamate), 4-chloro-1,2-phenylene bis(diisopropylcarbamate), 4-chloro-1,2-phenylene bis(dimethylcarbamate), 4-chloro-1,2-phenylene bis(diphenylcarbamate), 4-chloro-1,2-phenylene dicarbamate, naphthalene-2,3-diyl bis(diethylcarbamate), naphthalene-2,3-diyl bis(diisopropylcarbamate), naphthalene-2,3-diyl bis(dimethylcarbamate), naphthalene-2,3-diyl dicarbamate, naphthalene-1,2-diyl bis(diethylcarbamate), naphthalene-1,2-diyl bis(diisopropylcarbamate), naphthalene-1,2-diyl bis(dimethylcarbamate), naphthalene-1,2-diyl dicarbamate, naphthalene-1,8-diyl bis(diethylcarbamate), naphthalene-1,8-diyl bis(diisopropylcarbamate), naphthalene-1,8-diyl bis(dimethylcarbamate), naphthalene-1,8-diyl dicarbamate.

The compounds falling in formula (I) and (II) can be generally prepared reacting the starting diol HO-A-OH with a suitable N,N-disubstituted carbamoyl chloride, in presence of a stoichiometric amount of base or Lewis acid like AlCl$_3$ or TiCl$_4$.

The electron donor compounds of the present invention can be used in the solid catalyst component also in mixtures with other electron donors such as esters, esters, ethers, amines, silanes and ketones or mixtures thereof. Particularly preferred classes are alkyl and aryl esters of optionally substituted aromatic mono or polycarboxylic acids such as for example esters of benzoic acids, and esters of aliphatic acids selected from malonic, succinic glutaric and maleic acids. In particular, can be advantageously used also the 1,3 diethers of the formula (III):

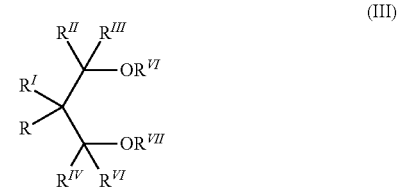

(III)

wherein R, $R^I$, $R^{II}$, $R^{III}$, $R^{IV}$ and $R^V$ equal or different to each other, are hydrogen or hydrocarbon radicals having from 1 to 18 carbon atoms, and $R^{VI}$ and $R^{VII}$, equal or different from each other, have the same meaning of R—R$^V$ except that they cannot be hydrogen; one or more of the R—R$^{VII}$ groups can be linked to form a cycle. The 1,3-diethers in which R$^{VI}$ and R$^{VII}$ are selected from $C_1$-$C_4$ alkyl radicals are particularly preferred.

In solid catalyst component of the invention the amount of Ti atoms in the solid catalyst component is preferably higher than 2.5% wt more preferably higher than 3.0% with respect to the total weight of said catalyst component.

As explained above, the catalyst components of the invention comprise, in addition to the above electron donors, Ti, Mg and halogen. In particular, the catalyst components comprise a titanium compound, having at least a Ti-halogen bond and the above mentioned electron donor compounds supported on a Mg halide. The magnesium halide is preferably $MgCl_2$ in active form which is widely known from the patent literature as a support for Ziegler-Natta catalysts. Patents U.S. Pat. Nos. 4,298,718 and 4,495,338 were the first to describe the use of these compounds in Ziegler-Natta catalysis. It is known from these patents that the magnesium dihalides in active form used as support or co-support in components of catalysts for the polymerization of olefins are characterized by X-ray spectra in which the most intense diffraction line that appears in the spectrum of the non-active halide is diminished in intensity and is replaced by a halo whose maximum intensity is displaced towards lower angles relative to that of the more intense line.

The preferred titanium compounds used in the catalyst component of the present invention are $TiCl_4$ and $TiCl_3$; furthermore, also Ti-haloalcoholates of formula $Ti(OR)_{m-y}X_y$, can be used, where m is the valence of titanium, y is a number between 1 and m-1, X is halogen and R is a hydrocarbon radical having from 1 to 10 carbon atoms.

The preparation of the solid catalyst component can be carried out according to several methods. One method comprises the reaction between magnesium alcoholates or chloroalcoholates (in particular chloroalcoholates prepared according to U.S. Pat. No. 4,220,554) and an excess of $TiCl_4$ in the presence of the electron donor compounds at a temperature of about 80 to 120° C.

According to a preferred method, the solid catalyst component can be prepared by reacting a titanium compound of formula $Ti(OR)_{m-y}X_y$, where m is the valence of titanium and y is a number between 1 and m, preferably $TiCl_4$, with a magnesium chloride deriving from an adduct of formula $MgCl_2 \cdot pROH$, where p is a number between 0.1 and 6, preferably from 2 to 3.5, and R is a hydrocarbon radical having 1-18 carbon atoms. The adduct can be suitably prepared in spherical form by mixing alcohol and magnesium chloride in the presence of an inert hydrocarbon immiscible with the adduct, operating under stirring conditions at the melting temperature of the adduct (100-130° C.). Then, the emulsion is quickly quenched, thereby causing the solidification of the adduct in form of spherical particles. Examples of spherical adducts prepared according to this procedure are described in U.S. Pat. Nos. 4,399,054 and 4,469,648. The so obtained adduct can be directly reacted with Ti compound or it can be previously subjected to thermal controlled dealcoholation (80-130° C.) so as to obtain an adduct in which the number of moles of alcohol is generally lower than 3, preferably between 0.1 and 2.5. The reaction with the Ti compound can be carried out by suspending the adduct (dealcoholated or as such) in cold $TiCl_4$ (generally 0° C.); the mixture is heated up to 80-130° C. and kept at this temperature for 0.5-2 hours. The treatment with $TiCl_4$ can be carried out one or more times. The electron donor compound is preferably added during the treatment with $TiCl_4$. The preparation of catalyst components in spherical form are described for example in European Patent Applications EP-A-395083, EP-A-553805, EP-A-553806, EPA601525 and WO9844001.

The solid catalyst components obtained according to the above method show a surface area (by B.E.T. method) generally between 20 and 500 $m^2$/g and preferably between 50 and 400 $m^2$/g, and a total porosity (by B.E.T. method) higher than 0.2 $cm^3$/g preferably between 0.2 and 0.6 $cm^3$/g. The porosity (Hg method) due to pores with radius up to 10.000 Å generally ranges from 0.3 to 1.5 $cm^3$/g, preferably from 0.45 to 1 $cm^3$/g.

The solid catalyst component has an average particle size ranging from 5 to 120 μm and more preferably from 10 to 100 μm.

In any of these preparation methods the desired electron donor compounds can be added as such or, in an alternative way, it can be obtained in situ by using an appropriate precursor capable to be transformed in the desired electron donor compound by means, for example, of known chemical reactions.

Regardless of the preparation method used, the final amount of the electron donor compound of formula (I) is such that its molar ratio with respect to the Ti atoms is from 0.01 to 2, preferably from 0.05 to 1.2.

The solid catalyst components according to the present invention are converted into catalysts for the polymerization of olefins by reacting them with organoaluminum compounds according to known methods.

In particular, it is an object of the present invention a catalyst for the polymerization of olefins $CH_2$=CHR, in which R is hydrogen or a hydrocarbyl radical with 1-12 carbon atoms, comprising the product obtained by contacting:

(i) the solid catalyst component as disclosed above and
(ii) an alkylaluminum compound and optionally,
(iii) an external electron donor compound.

The alkyl-Al compound (ii) is preferably chosen among the trialkyl aluminum compounds such as for example triethylaluminum, triisobutylaluminum, tri-n-butylaluminum, tri-n-hexylaluminum, tri-n-octylaluminum. It is also possible to use alkylaluminum halides, alkylaluminum hydrides or alkylaluminum sesquichlorides, such as $AlEt_2Cl$ and $Al_2Et_3Cl_3$, possibly in mixture with the above cited trialkylaluminums.

Suitable external electron-donor compounds include silicon compounds, ethers, esters, amines, heterocyclic compounds and particularly 2,2,6,6-tetramethylpiperidine and ketones.

Another class of preferred external donor compounds is that of silicon compounds of formula $(R_7)_a(R_8)_bSi(OR_9)_c$, where a and b are integers from 0 to 2, c is an integer from 1 to 4 and the sum (a+b+c) is 4; $R_7$, $R_8$, and $R_9$, are radicals with 1-18 carbon atoms optionally containing heteroatoms. Particularly preferred are the silicon compounds in which a is 1, b is 1, c is 2, at least one of $R_7$ and $R_8$ is selected from branched alkyl, cycloalkyl or aryl groups with 3-10 carbon atoms optionally containing heteroatoms and $R_9$ is a $C_1$-$C_{10}$ alkyl group, in particular methyl. Examples of such preferred silicon compounds are methylcyclohexyldimethoxysilane (C donor), diphenyldimethoxysilane, methyl-t-butyldimethoxysilane, dicyclopentyldimethoxysilane (D donor), diisopropyldimethoxysilane, (2-ethylpiperidinyl)t-butyldimethoxysilane, (2-ethylpiperidinyl)thexyldimethoxysilane, (3,3,3-trifluoro-n-propyl)(2-ethylpiperidinyl)dimethoxysilane, methyl(3,3,3-trifluoro-n-propyl) dimethoxysilane, N,N-diethylaminotriethoxysilane.

Moreover, are also preferred the silicon compounds in which a is 0, c is 3, $R_8$ is a branched alkyl or cycloalkyl group, optionally containing heteroatoms, and $R_9$ is methyl. Examples of such preferred silicon compounds are cyclohexyltrimethoxysilane, t-butyltrimethoxysilane and thexyltrimethoxysilane.

The electron donor compound (iii) is used in such an amount to give a molar ratio between the organoaluminum compound and said electron donor compound (iii) of from 0.1 to 500, preferably from 1 to 300 and more preferably from 3 to 100.

Therefore, it constitutes a further object of the present invention a process for the (co)polymerization of olefins $CH_2=CHR$, in which R is hydrogen or a hydrocarbyl radical with 1-12 carbon atoms, carried out in the presence of a catalyst comprising the product of the reaction between:
(i) the solid catalyst component of the invention;
(ii) an alkylaluminum compound and,
(iii) optionally an electron-donor compound (external donor).

The polymerization process can be carried out according to known techniques for example slurry polymerization using as diluent an inert hydrocarbon solvent, or bulk polymerization using the liquid monomer (for example propylene) as a reaction medium. Moreover, it is possible to carry out the polymerization process in gas-phase operating in one or more fluidized or mechanically agitated bed reactors.

The polymerization is generally carried out at temperature of from 20 to 120° C., preferably of from 40 to 80° C. When the polymerization is carried out in gas-phase the operating pressure is generally between 0.5 and 5 MPa, preferably between 1 and 4 MPa. In the bulk polymerization the operating pressure is generally between 1 and 8 MPa, preferably between 1.5 and 5 MPa.

The following examples are given in order to illustrate the invention without limiting it.

Characterizations

Determination of X.I.

2.5 g of polymer and 250 ml of o-xylene were placed in a round-bottomed flask provided with a cooler and a reflux condenser and kept under nitrogen. The obtained mixture was heated to 135° C. and was kept under stirring for about 60 minutes. The final solution was allowed to cool to 25° C. under continuous stirring, and the insoluble polymer was then filtered. The filtrate was then evaporated in a nitrogen flow at 140° C. to reach a constant weight. The content of said xylene-soluble fraction is expressed as a percentage of the original 2.5 grams and then, by difference, the X.I.%

Determination of Donors

The content of electron donor has been carried out via gas-chromatography. The solid component was dissolved in acidic water. The solution was extracted with ethyl acetate, an internal standard was added, and a sample of the organic phase was analyzed in a gas chromatograph, to determine the amount of donor present at the starting catalyst compound.

Melt Flow Rate (MFR)

The melt flow rate MIL of the polymer was determined according to ISO 1133 (230° C., 2.16 Kg).

EXAMPLES

Synthesis of 3,5-di-tert-butyl-1,2-phenylene bis(diethylcarbamate)

5 g of 3,5-di-tert-butylcatechol (22.5 mmol) are charged in a round bottom flask with 60 mL of THF under nitrogen. 1.2 g of NaH (47.3 mmol) are added carefully under stirring then 6.3 mL of diethylcarbamoyl chloride (50 mmol) are added dropwise. The mixture is left to stir at room temperature until GC shows that the reaction is completed. Then the mixture is diluted with acidic water (180 mL) and extracted with ethyl acetate (100 mL). The organic layer is washed with water until neutral pH, then is anhydrified over $Na_2SO_4$ and the solvent is distilled off to afford 9.4 g of residue (99% of yield) with a GC purity of 99%.

Synthesis of 4-(tert-butyl)-1,2-phenylene bis(diethylcarbamate)

The procedure is the same as that used for 3,5-di-tert-butyl-1,2-phenylene bis(diethylcarbamate) except that 4-tert-butylcatechol is used as starting diol.

Synthesis of 5-(tert-butyl)-3-methyl-1,2-phenylene bis(diethylcarbamate)

The procedure is the same as that used for 3,5-di-tert-butyl-1,2-phenylene bis(diethylcarbamate) except that 5-(tert-butyl)-3-methylcatechol is used as starting diol.

Synthesis of Naphthalene-1,8-diyl bis(diethylcarbamate)

The procedure is the same as that used for 3,5-di-tert-butyl-1,2-phenylene bis(diethylcarbamate) except that naphthalene-1,8-diol is used as starting diol.

Synthesis of 2,2-diisobutylpropane-1,3-diyl bis(dimethylcarbamate)

The solution of 2,2-diisobutyl-1,3-propanediol (10.0 g, 53 mmol) in Et2O (200 mL) was treated with n-BuLi (2.5 mol/L in hexanes, 50 mL, 125 mmol) at 0° C. The reaction mixture was stirred at room temperature for 16 h, then it was cooled to −78° C. and was treated with solution of dimethylcarbamoyl chloride (12.9 mL, 140 mmol) in Et2O (35 mL). The resulting suspension was stirred for 16 h at room temperature and was treated with water. The organic layer was separated, dried over MgSO4, evaporated and the residue was crystallized from hexane at −20° C. Yield 9.51 g (54%). White crystals.

Synthesis of 5-(tert-butyl)-3-methyl-1,2-phenylene bis(dimethylcarbamate)

The procedure is the same as that used for 5-(tert-butyl)-3-methyl-1,2-phenylene bis(diethylcarbamate) except that dimethylcarbamoyl chloride is used instead of diethylcarbamoyl chloride.

Synthesis of 5-(tert-butyl)-3-methyl-1,2-phenylene bis(diphenylcarbamate)

The procedure is the same as that used for 5-(tert-butyl)-3-methyl-1,2-phenylene bis(diethylcarbamate) except that diphenylcarbamoyl chloride is used instead of diethylcarbamoyl chloride.

Synthesis of 5-(tert-butyl)-3-methyl-1,2-phenylene bis(pyrrolidine-1-carboxylate)

The procedure is the same as that used for 5-(tert-butyl)-3-methyl-1,2-phenylene bis(diethylcarbamate) except that 1-pyrrolidinecarbonyl chloride is used instead of diethylcarbamoyl chloride.

Synthesis of naphthalene-2,3-diyl bis(diethylcarbamate)

The procedure is the same as that used for 3,5-di-tert-butyl-1,2-phenylene bis(diethylcarbamate) except that naphthalene-2,3-diol is used as starting diol.

General Procedure for Preparation of the Spherical Adducts

An initial amount of microspheroidal MgCl2.2.8C2H5OH was prepared according to the method described in Example 2 of WO9844009, but operating on larger scale.

General Procedure for the Preparation of the Solid Catalyst Component

Into a 500 mL round bottom flask, equipped with mechanical stirrer, cooler and thermometer 250 mL of TiCl4 were introduced at room temperature under nitrogen atmosphere. After cooling to 0° C., while stirring, the internal donor and 10.0 g of the spherical adduct (prepared as described above) were sequentially added into the flask. The amount of charged internal donor was such to charge a Mg/donor molar ratio of 6. The temperature was raised to 100° C. and maintained for 2 hours. Thereafter, stirring was stopped, the solid product was allowed to settle and the supernatant liquid was siphoned off at 100° C. After the supernatant was removed, additional fresh TiCl4 was added to reach the initial liquid volume again. The mixture was then heated at 120° C. and kept at this temperature for 1 hour. Stirring was stopped again, the solid was allowed to settle and the supernatant liquid was siphoned off. The solid was washed with anhydrous hexane six times (6×100 mL) in temperature gradient down to 60° C. and one time (100 mL) at room temperature. The obtained solid was then dried under vacuum and analyzed.

General Procedure for the Polymerization of Propylene

A 4liter steel autoclave equipped with a stirrer, pressure gauge, thermometer, catalyst feeding system, monomer feeding lines and thermostating jacket, was purged with nitrogen flow at 70° C. for one hour. Then, at 30° C. under propylene flow, were charged in sequence with 75 mL of anhydrous hexane, 0.76 g of AlEt3, the external electron donor indicated in Table 1 (if used) and 0.006÷0.010 g of solid catalyst component. The autoclave was closed; subsequently 2.0 NL of hydrogen were added. Then, under stirring, 1.2 kg of liquid propylene was fed. The temperature was raised to 70° C. in five minutes and the polymerization was carried out at this temperature for two hours. At the end of the polymerization, the non-reacted propylene was removed; the polymer was recovered and dried at 70° C. under vacuum for three hours. Then the polymer was weighed and fractionated with o-xylene to determine the amount of the xylene insoluble (X.I.) fraction.

Examples 1-11

The catalyst components were prepared according to the general procedure using the donors indicated in Table 1. The so obtained solid catalyst components were analyzed for their composition, and were tested in polymerization of propylene, using the procedure described above. The results are listed in Table 1.

Example 12

The same procedure of example 1 was used with the only difference that the spherical adduct before being, used in the preparation of the catalyst, was exposed to a thermal dealcoholation at increasing temperatures from 30 to 130° C. operating in nitrogen current until the residual alcohol content was 50% wt based on the total weight of the adduct.

Example 13

The same procedure of example 1 was used with the only difference that the spherical adduct before being, used in the preparation of the catalyst, was then subject to thermal dealcoholation at increasing temperatures from 30 to 130° C. operating in nitrogen current until the molar alcohol content per mol of Mg was 1.16.

TABLE 1

Composition and performance of exemplified catalysts

| | Catalyst compostion Internal Donor | | Ti | | Polymerization | | |
|---|---|---|---|---|---|---|---|
| | | | | | Mileage | XI | MIL |
| | Name | % wt | % wt | ED | kg/g | % wt | g/10' |
| 1 | 3,5-di-tert-butyl-1,2-phenylene bis(diethylcarbamate) | 11.7 | 4.4 | D | 30 | 95.3 | 0.8 |
| 2 | 4-(tert-butyl)-1,2-phenylene bis(diethylcarbamate) | 10.8 | 4.1 | D | 32 | 96.3 | 2.4 |
| 3 | 5-(tert-butyl)-3-methyl-1,2-phenylene bis(diethylcarbamate) | 18.9 | 4.4 | D | 83 | 98.9 | 0.1 |
| 4 | naphthalene-1,8-diyl bis(diethylcarbamate) | 26.7 | 6.0 | D | 16 | 96.2 | 2.4 |
| 5 | 2,2-diisobutylpropane-1,3-diyl bis(dimethylcarbamate) | 19.8 | 3.9 | D | 25 | 95.5 | 7.0 |
| 6 | 5-(tert-butyl)-3-methyl-1,2-phenylene bis(diethylcarbamate) | 18.9 | 4.4 | C | 74 | 98.4 | 0.1 |
| 7 | 5-(tert-butyl)-3-methyl-1,2-phenylene bis(diethylcarbamate) | 18.9 | 4.4 | no | 76 | 94.8 | 0.2 |
| 8 | 5-(tert-butyl)-3-methyl-1,2-phenylene bis(dimethylcarbamate) | 14.2 | 4.3 | D | 43 | 96.9 | 2.3 |
| 9 | 5-(tert-butyl)-3-methyl-1,2-phenylene bis(diphenylcarbamate) | N.D. | 4.9 | D | 47 | 97.8 | 3.5 |
| 10 | 5-(tert-butyl)-3-methyl-1,2-phenylene bis(pyrrolidine-1-carboxylate) | 13.4 | 4.9 | D | 51 | 97.4 | 0.5 |
| 11 | naphthalene-2,3-diyl bis(diethylcarbamate) | 10.2 | 5.0 | D | 30 | 96.1 | 0.4 |
| 12 | 5-(tert-butyl)-3-methyl-1,2-phenylene bis(diethylcarbamate) | 16.9 | 4.4 | D | 63 | 98.9 | N.D. |
| 13 | 5-(tert-butyl)-3-methyl-1,2-phenylene bis(diethylcarbamate) | 7.6 | 3.4 | D | 22 | 95.7 | N.D. |

ED: External Donor.
C: methylcyclohexyldimethoxysilane
D: dicyclopentyldimethoxysilane
N.D.: not determined

The invention claimed is:

1. A catalyst comprising a solid catalyst component comprising: Mg, Ti and an electron donor of formula (I)

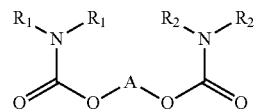

where $R_1$ and $R_2$, independently, are selected from hydrogen and $C_1$-$C_{15}$ hydrocarbon groups, optionally containing a heteroatom selected from halogen, P, S, N, O and Si, which can be fused together to form one or more cycles, and A is a bivalent bridging group.

2. The catalyst according to claim 1 in which A is bivalent bridging group having two free radicals, wherein the chain length between the two free radicals is 1 to 10 atoms.

3. The catalyst according to claim 1 in which the bridging group is of the formula —$(ZR^3{}_m)_n$— in which, independently, Z is selected from C, Si, Ge, O, N, S or P, the $R^3$ groups, equal to or different from each other, are hydrogen or $C_1$-$C_{20}$ hydrocarbon radicals, optionally containing a heteroatom selected from halogen, P, S, N, O and Si, which can be fused together to form one or more cycles, m is a number satisfying the valences of Z and n is an integer ranging from 1 to 10.

4. The catalyst according to claim 3 in which the bridging group is selected from the group consisting of aliphatic, alicyclic and aromatic bivalent radicals, optionally substituted with $C_1$-$C_{15}$ hydrocarbon groups and/or with heteroatoms selected from halogen, P, S, N, O and Si, having a bridging chain length ranging from 1 to 6 atoms.

5. The catalyst according to claim 4 in which the bridging group is selected from cyclic aromatic compounds.

6. The catalyst according to claim 1 in which the electron donor compound is selected from those of formula (II)

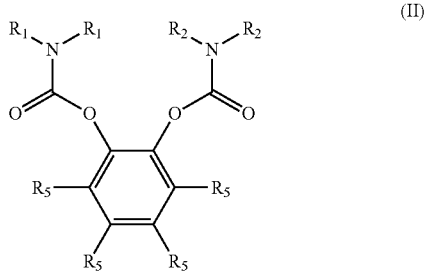

(II)

in which $R_1$ and $R_2$, independently, are selected from hydrogen and $C_1$-$C_{15}$ hydrocarbon groups, optionally containing an heteroatom selected from halogen, P, S, N, O and Si, which can be fused together to form one or more cycles and $R_5$, independently, is selected from hydrogen, halogens or $C_1$-$C_{15}$ hydrocarbon groups optionally substituted with heteroatoms selected from halogen, P, S, N, O and Si, with the proviso that at least one of $R_5$ is different from hydrogen.

7. The catalyst according to claim 6 in which in the donor of formula (II) the $R_5$ groups in position 3,5 and/or 6 are $C_1$-$C_5$ alkyl groups.

8. The catalyst according to claim 7 in which $R_5$ in position 3 is a primary alkyl group and that in position 5 is a tertiary alkyl group.

9. The catalyst according to claim 1 in which $R_1$-$R_2$ groups are independently selected from hydrogen, $C_1$-$C_{15}$ alkyl groups, $C_6$-$C_{14}$ aryl groups, $C_3$-$C_{15}$ cycloalkyl groups, and $C_7$-$C_{15}$ arylalkyl or alkylaryl groups.

10. The catalyst according to claim 9 in which $R_1$ and $R_2$ are $C_1$-$C_5$ alkyl groups.

11. The catalyst of claim 1, comprising the product of the reaction between:
(i) the solid catalyst component, and
(ii) an alkylaluminum compound.

12. The catalyst according to claim 11 further comprising an external electron donor compound.

13. The catalyst of claim 11, wherein at least one olefin having the formula, $CH_2$=CHR, in which R is hydrogen or a hydrocarbyl radical with 1-12 carbon atoms, is polymerized in the presence of the catalyst.

* * * * *

UNITED STATES PATENT AND TRADEMARK OFFICE
CERTIFICATE OF CORRECTION

| | |
|---|---|
| PATENT NO. | : 9,670,298 B2 |
| APPLICATION NO. | : 14/432080 |
| DATED | : June 6, 2017 |
| INVENTOR(S) | : Alessandro Mignogna et al. |

It is certified that error appears in the above-identified patent and that said Letters Patent is hereby corrected as shown below:

On the Title Page

| | | |
|---|---|---|
| Column 1, item (54) | Line 2 | Delete "COMPONENT" and insert --COMPONENTS-- |
| Column 1, item (72) | Line 2 | Delete "Ferarra" and insert --Ferrara-- |

In the Specification

| | | |
|---|---|---|
| Column 1 | Line 2 | Delete "COMPONENT" and insert --COMPONENTS-- |
| Column 1 | Line 62 | Delete "R1-C(O)-O-A-NR$_2$R$_3$" and insert --R$_1$-C(O)-O-A-NR$_2$R$_3$-- |
| Column 8 | Line 51 | Delete "(R$_7$)$_a$(R$_8$)bSi(OR$_9$)$_c$," and insert --(R$_7$)$_a$(R$_8$)$_b$Si(OR$_9$)$_c$,-- |
| Column 10 | Line 28 | Delete "Et2O" and insert --Et$_2$O-- |
| Column 10 | Line 32 | Delete "Et2O" and insert --Et$_2$O-- |
| Column 10 | Line 35 | Delete "MgSO4," and insert --MgSO$_4$,-- |
| Column 10 | Line 65 | Delete "MgCl2.2.8C2H5OH" and insert --MgCl$_2$.2.8C$_2$H$_5$OH-- |
| Column 11 | Line 4 | Delete "TiCl4" and insert --TiCl$_4$-- |
| Column 11 | Line 14 | Delete "TiCl4" and insert --TiCl$_4$-- |
| Column 11 | Line 29 | Delete "AlEt3," and insert --AlEt$_3$,-- |

Signed and Sealed this
Twenty-eighth Day of January, 2020

Andrei Iancu
*Director of the United States Patent and Trademark Office*